United States Patent [19]

Trumpp

[11] Patent Number: 4,785,299

[45] Date of Patent: Nov. 15, 1988

[54] BROADBAND SIGNAL SPACE SWITCHING APPARATUS

[75] Inventor: Gerhard Trumpp, Puchheim, Fed. Rep. of Germany

[73] Assignee: Siemens Aktiengesellschaft, Berlin and Munich, Fed. Rep. of Germany

[21] Appl. No.: 13,069

[22] Filed: Feb. 10, 1987

[30] Foreign Application Priority Data

Feb. 14, 1986 [DE] Fed. Rep. of Germany ....... 3604605

[51] Int. Cl.$^4$ .................... H04Q 3/52; H03K 19/20
[52] U.S. Cl. .................. 340/825.890; 340/825.910; 379/292; 307/279; 307/272.2
[58] Field of Search ............ 340/825.89, 825.87, 340/825.91, 825.96; 379/292, 306; 307/272 A, 279

[56] References Cited

U.S. PATENT DOCUMENTS

| | | | |
|---|---|---|---|
| 3,431,433 | 3/1969 | Ball et al. ............................ | 307/221 |
| 3,609,661 | 9/1971 | Hennes et al. ................. | 340/825.91 |
| 3,618,024 | 11/1971 | Leger et al. .................... | 340/825.91 |
| 3,651,467 | 3/1972 | De Jean et al. ................ | 340/825.91 |
| 3,832,495 | 8/1974 | Hovagimyan et al. ............ | 379/292 |
| 4,107,472 | 8/1978 | Kawanami et al. ............ | 340/825.96 |

FOREIGN PATENT DOCUMENTS

| | | | |
|---|---|---|---|
| 0073920 | 3/1983 | European Pat. Off. | |
| 0199601 | 10/1986 | European Pat. Off. ....... | 340/825.87 |

OTHER PUBLICATIONS

Duret et al., "Integrated . . . Switching Networks", ISS '84, May 1984, Session 31 C, Paper No. 3, pp. 1–7.
Sunazawa et al., "Wideband Integrated Crosspoint Switch Matrix", Rev. Elec. Comm. Lab., vol. 25, No. 1, 1977, pp. 43–51.
Ohmori et al., "MOS IC . . . Switching Networks", IEEE Journal of Solid-State Circuits, vol. SC-9, No. 3, Jun. 1974, pp. 142–147.
Kuroyanagi N., "Studies . . . Switching Networks, " Electronics 2nd Communications in Japan, vol. 53-A, No. 10, 1970, pp. 54–62.
Pfannschmidt H., "Arbeitsgeschwindigkeitsgrenzen . . . Digital Signale", Universität Carolo-Wilhelmina, Braunschweig, 1978, pp. 120–125.
Széchéni et al., "Die . . . Nebenstellenanlagen UNI-MAT, " Elektrisches Nachrichtenwesen, vol. 53, No. 4, 1978, pp. 294–295.

*Primary Examiner*—Donald J. Yusko
*Attorney, Agent, or Firm*—Hill, Van Santen, Steadman & Simpson

[57] ABSTRACT

In a broadband signal space switching device comprising a crosspoint matrix constructed in FET technology whose switch elements are respectively controlled by a cross-point-associated memory cell which is decoder-controlled in two coordinate directions, the memory cell is formed by an n-channel transistor and two cross-coupled inverter circuits of which one has its input side connected to the appertaining decoder output of the one selection decoder via an n-channel transistor which, in turn, is charged at its control electrode with the corresponding output signal of the selection decoder, and of which the other leads at its output side to the control input of the appertaining switch element. The switch element is constructed from a single n-channel transistor.

7 Claims, 2 Drawing Sheets

BROADBAND SIGNAL SPACE SWITCHING APPARATUS

BACKGROUND OF THE INVENTION

1. Field of the Invention

The present invention relates to telecommunications apparatus and is particularly concerned with broadband signal space switching apparatus.

2. Description of the Prior Art

Recent developments in telecommunications technology have led to service-integrated communications transmission/ systems for narrow band and broadband communication services which provide light waveguides as transmission media in the region of the subscriber lines, both the narrow band communication services such as, in particular, 64 Kbit/s digital telephony, and broadband communication services such as, particularly, 140 Mbit/s picture telephony, being conducted via the light waveguides, whereby, however, dedicated narrow band signal switching devices and broadband signal switching devices (preferably having shared control devices) are provided in the switching centers. In this context, reference is taken to the German Pat. No. 24 21 002, fully incorporated herein by this reference.

It is known in the context of a broadband signal time-division multiplex switching device, whose crosspoints are respectively utilized in time-division multiplex for a plurality of connections, to connect respectively two lines with the assistance of a gate which is switched on and off by a crosspoint-associated memory cell constructed as a D flip-flop circuit, whereby the crosspoint-associated memory cell, whose clock input is supplied with an appropriate timing signal, is selected in only one coordinate direction, namely at its D input. In this connection, reference should be taken to Pfannschmidt, "Arbeitsgeschwindigkeitsgrenzen von Koppelnetzwerken fur Breitband-Digitalsignale", Dissertation, Braunschweig 1978, FIG. 6.7, with further reference to FIG. 6.4. In view of a time-division multiplex factor of about 4–8 obtainable with a bit rate of 140 Mbit/s and of the involved circuit technology thereby required, however, exclusive space switching devices are currently preferred for switching the connections through-connected via the individual crosspoints being separated from one another only in a spatial manner.

An exclusive broadband signal space switching matrix network can be constructed as a crosspoint matrix in complementary-metal-oxide-semiconductor (CMOS) technology provided with input amplifiers and output amplifiers in whose crosspoints the switching elements are respectively controlled by a decoder-controlled, crosspoint-associated holding memory cell, whereby the switching elements are respectively constructed as CMOS transfer gates (CMOS transmission gates) of the type disclosed in ISS'84 Conference Papers 23C1, FIG. 9). Proceeding by way of a row-associated and a column-associated selection line, the crosspoint-associated holding memory cells of an exclusive space switching matrix can be respectively selected in two coordinates as disclosed in the aforementioned Pfannschmidt publication with respect to FIG. 6.4.

In a broadband signal space switching device comprising switching elements constructed in field effect transistor (FET technology, which are respectively formed with a CMOS inverter circuit comprising MOS transistors of the enhancement type, which has its input side connected to the appertaining signal input line and its output side leading to the appertaining signal output line, whereby a p-channel depletion transistor having its control electrode connected to the output of the memory cell is connected between the p-channel enhancement transistor thereof and the appertaining feed potential source and an n-channel depletion channel transistor having its control electrode connected to the complementary output of the memory cell is inserted between the n-channel enhancement transistor and the appertaining feed potential source, these switching elements can be respectively controlled by a cross-point-associated memory cell formed with an n-channel transistor and two feedback inverters, as discussed in the publication ISS'84 Conference Papers 31C3, with respect to FIG. 14.

In a broadband space switching device comprising a crosspoint matrix constructed in FET technology, the switching elements can also be respectively formed with an n-channel transistor having its drain-source path lying between a matrix input line and a matrix output line (cf. ISS'84 Conference Papers 31C3, with respect to FIG. 12), these switching elements being respectively controlled by a cross-point associated memory cell having two cross-coupled inverter circuits and which is controlled in two coordinates by two drive decoders, the one being connected at the input side to the appertaining, inverting decoder output of the one drive decoder via a first n-channel transistor and the other being connected at the input side to the appertaining non-inverting decoder output of the same drive decoder via a second n-channel transistor, whereby both n-channel transistors in turn, have their control electrodes charged with the output signal of the appertaining decoder output of the other drive selection decoder. In this connection, one may take reference to the publications Rev. ECL 25 (1977) 1-2, 43 ... 51, FIG. 1, IEEE Journal of Solid State Circuits 9 (1974) 3, 142 .. . 147, FIG. 1, and Electronics and Communications in Japan, 53-A (1970) 10, 54 ... 62, FIG. 5, and the European Patent Application No. EP-A-0 073 920, FIG. 5.

SUMMARY OF THE INVENTION

The object of the present invention, therefore, is to provide a manner in which the individual crosspoints in a broadband switching device can be realized in a particularly advantageous way with an even lower overall transistor expense.

It is disclosed elsewhere, in particular in the U.S. patent application Ser. No. 908,240 (German patent application No. P 35 33 915.2) that the memory cells formed with D flip-flops can be selectable to two selection decoders, each of which is charged with a crosspoint matrix line address and with an address clock signal, of which selection decoders, the decoder selecting in the one coordinate direction (row direction) has its respective decoder output connected to the D inputs of the D flip-flops arranged in the appertaining matrix line (row) and the respective decoder selecting in the other coordinate direction (column direction) has its respective decoder output connected to the clock inputs of the D flip-flops arranged in the appertaining matrix line (column). The memory cells can thereby be each formed with two cross-coupled CMOS inverter circuits of which the one inverter circuit has its input connected to the appertaining decoder output of the one selection decoder via a CMOS transistor gate which, in turn, just like a further CMOS transfer gate inserted into the feedback path leading to this input of the one CMOS inverter circuit, has its one input charged with the output signal of the appertaining decoder output of the other selection decoder and has its other input charged with the negated output signal of the same decoder output.

In comparison thereto, the present invention provides another way for a specific crosspoint realization having a particularly low transistor expense.

The present invention relates to a broadband signal space switching device comprising a crosspoint matrix constructed in FET technology whose switching elements respectively formed with an n-channel transistor, having its drain-source path lying between a matrix input line and a matrix output line, are respectively driven by a crosspoint-associated memory cell selected in two coordinates by two selection decoders (row decoder, column decoder). The memory cell is formed with an n-channel transistor and two cross-coupled inverter circuits, whereby an inverter circuit has its input connected to the appertaining decoder output of the one selection decoder via the n-channel transistor which, in turn, has its control electrode charged with the output signal of the appertaining decoder output of the other selection decoder, and whereby the output side of an inverter circuit leads to the control input of the appertaining switching element. This space switching device, according to the present invention, is particularly characterized in that only one of the two inverter circuits has its input provided with a decoder-controlled n-channel transistor and, at the same time, only one of the two inverter circuits has its output connected to the gate electrode of the respective n-channel transistor of the switching element which has its drain-source path lying between a matrix input line and a matrix output line, being connected thereto via a series resistor.

The present invention provides the advantage of being able to realize crosspoint-associated holding memory cells provided in a crosspoint matrix and to be selected in a simple manner in two respective coordinates with a particularly low transistor expense and, therefore, this being particularly significant with respect to integration, with a correspondingly low space requirement and with correspondingly low switching capacitances. An additional reduction of the low capacitances which are effective at the switching matrix network input or, respectively, output lines carrying the signal to be through-connected or, respectively, through-connected is effective by the series resistor connecting the output of the holding memory cell to the gate electrode of the n-channel transistor in the switching element, the output capacitance of the memory cell being decoupled from the gate of the n-channel switching element by way of the series resistor.

According to another feature of the invention, the switching element can be formed by a single n-channel transistor whose gate electrode is charged by the memory cell with a circuit-switching potential exceeding an upper limit value of a signal to be through-connected by more than the transistor pinch-off voltage, or, respectively, with a circuit blocking potential falling below a level established by boosting the lower (limit) value of a signal to be through-connected by the transistor pinch-off voltage. The memory cell can thereby be preferably formed with two cross-coupled N-MOS inverter circuits.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
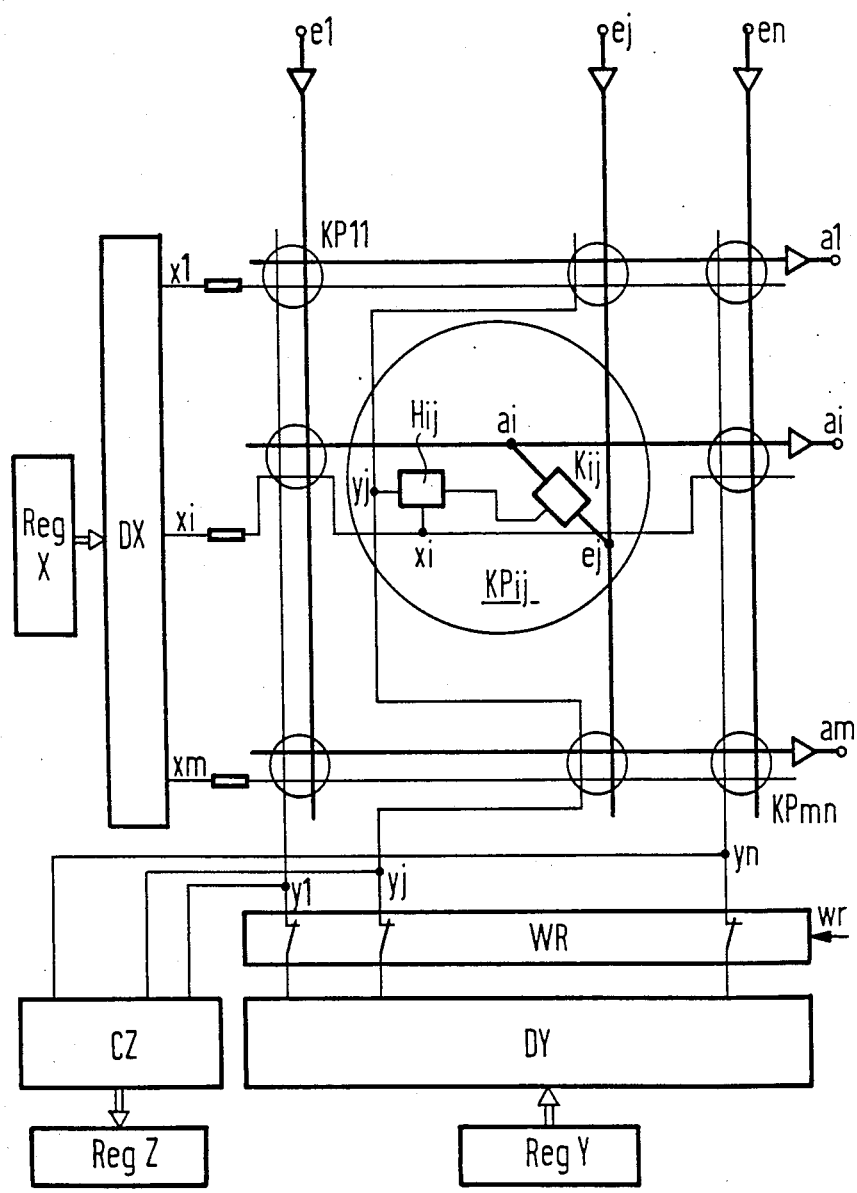
FIG. 1 is a circuit diagram of a broadband switching device.

In FIG. 1 there is a schematic illustration of a broadband signal space switching device constructed in accordance with the present invention and illustrated in a scope necessary for an understanding of the invention. This space switching device comprises a crosspoint matrix including crosspoints KP11 . . . KPij . . . KPmn whose switching elements, as indicated in greater detail at the crosspoint KPij for the switching element Kij thereof are respectively controlled by a crosspoint-associated memory cell Hij (at the crosspoint KPij), whose output is connected to the control input of the respective switch element (Kij at the crosspoint KPij). The holding memory cells Hij are in turn selected in two coordinate directions by two selection decoders, namely a row decoder Dx and a column decoder DY, via corresponding selection lines xl . . . xi . . . xm; yl . . . yj . . . yn.

As may be seen from FIG. 1, it is assumed that the two selection decoders Dx and Dy are respectively charged from respective input registers Reg X, Reg Y with a crosspoint row and a crosspoint column address shared by a matrix line (row, column) of crosspoints, in response whereto they respectively output a "1" selection signal to the selection line corresponding to the respective crosspoint line address.

The coincidence of a row selection signal "1" and of a column selection signal "1" at the intersection of the appertaining matrix row with the appertaining matrix column during the set-up of a corresponding connection then causes an activation of the holding memory cell located at the crosspoint, for example of the holding memory cell Hij with the result that the switching element controlled by the holding memory cell Hij, the switching element Kij in the present example, becomes conductive.

So that the switch element Kij under consideration in the present example becomes inhibited, in turn, given cleardown of the appertaining connection, the selection decoder DX is again charged with the appertaining row address by the input register Reg X, so that the row decoder DX again outputs a row selection signal "1" at its output line xi, and, at the same time, the column decoder DY is charged, for example, with a dummy address proceeding from its input register Reg Y or with the address of a column of unconnected crosspoints, so that it outputs a column selection "0" at its output line yj. The coincidence of the row selection signal "1" and the column selection signal "0" then causes the resetting of the holding memory cell Hij with the result that the switch element Kij controlled thereby is inhibited.

Figure 2:
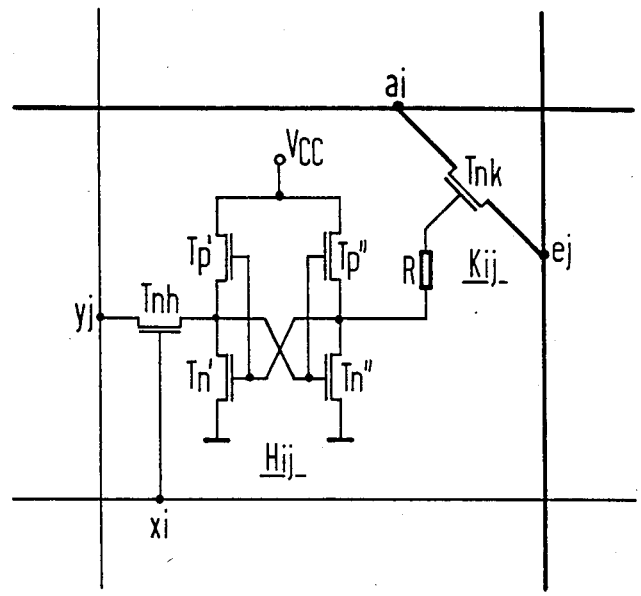
FIG. 2 is a schematic circuit diagram of a holding memory cell constructed in accordance with the present invention.
Figure 3:
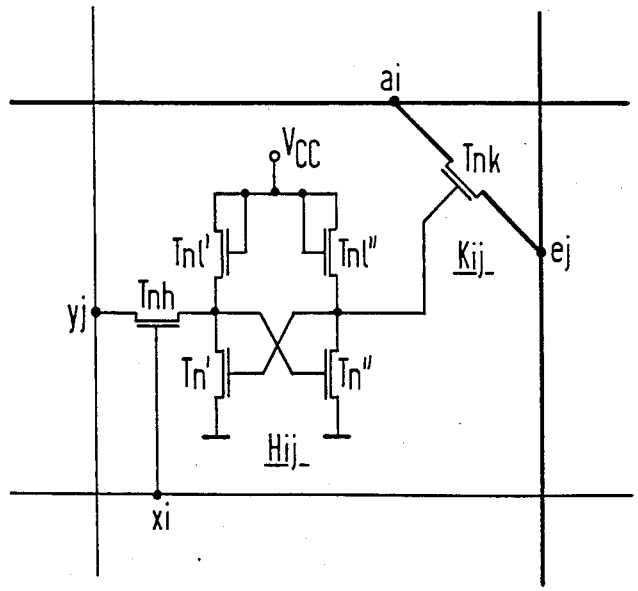
FIG. 3 is a schematic circuit diagram of another embodiment of a holding memory cell constructed in accordance with the present invention.

As may be seen in greater detail in FIGS. 2 and 3, the memory cell Hij which is selected in two coordinates by the two selection decoders (the row decoder DX and the column decoder DY of FIG. 1) is formed by an n-channel transistor Tnh and by two cross coupled inverter circuits Tn', Tp'; Tn", Tp" (in FIG. 2) or, respectively, Tn', Tn1'; Tn", Tn1" (in FIG. 3), of which one has its input side connected to the appertaining decoder output yj of the one selection decoder (DY of FIG. 1) via the n-channel transistor Tnh which, in turn, has its control electrode charged with the output signal of the appertaining decoder output xi of the other selection decoder (DX in FIG. 1, and has its output side leading to the control input of the switch element Kij. In the circuit arrangement of FIG. 2, the memory Hij is thereby formed with two cross-coupled CMOS inverter circuits Tn', Tp'; Tn", Tp". In FIG. 3, the memory cell Hij is respectively formed with two cross-coupled n-channel inverter circuits Tn', Tn1'; Tn", Tn1".

The switch element Kij is respectively formed by a single n-channel transistor Tnk which has its gate electrode connected with the circuit-switching potential ("H" level) exceeding the upper limit value of a signal to be through-connected between the input line ej and the output line ai by more than the transistor pinch-off voltage or, respectively, with an inhibit potential ("L" level) falling below the level established by boosting the lower limit value of a signal to be through-connected between the input line ej and output line ai by the transistor pinch-off voltage. As may also be seen from FIG. 2, the control output of the holding memory cell Hij can thereby be connected via a series resistor R to the gate electrode of the n-channel transistor Tnk forming the switch element Kij in order to therefore decouple the output capacitance of the holding memory cell Hij from the gate electrode of the n-channel transistor Tnk in order to therefore maintain the load capacitances at the signal lines ej and ai optimally low.

The n-channel transistor switch Kij is closed (rendered conductive) in that the "H" control potential (circuit-switching potential) is applied to the gate electrode of the n-channel transistor Tnk from the holding memory cell Hij this H control potential exceeding the upper limit value of the signal to be through-connected by more than the transistor pinch-off voltage of, for example, about 0.7V; the n-channel transistor switch Kij is opened (rendered nonconductive) in that the "L" control potential (the inhibit potential) is applied to the gate electrode of the n-channel transistor Tnk, this "L" control potential falling below a level lying above the lower limit value of a signal to be through-connected by the transistor pinch-off voltage of about 0.7V. In order to avoid undesirable intermediate states, the specified limits of potential should be noticeably upwardly or downwardly transgressed. When, therefore, for example, the level of the signal to be through-connected between the input lines ej and the output lines ai comprise the limit values 0V and 3V, then the n-channel transistor Tnk can be advantageously inhibited with an inhibit potential of 0V and can be through-connected with a circuit switching potential of 4.2V.

For closing of an n-channel transistor switch Kij, the holding memory cell Hij is charged via the row selection line xi with a "1" selection signal ("H" selection signal), rendering the n-channel transistor Tnh conductive and is charged via the column selection line yj with a "1" selection signal ("L" selection signal). The result thereof is that the transistor Tn" in the two-coupled inverter circuits proceeds into its inhibited condition and the transistor Tn' becomes conductive so that the inverter feed potential $V_{cc}$ of, for example 4.5V takes effect at the gate electrode of the n-channel transistor Tnk via the resistor R and the n-channel transistor Tnk becomes conductive.

The holding memory cell Hij of FIG. 2 is constructed in CMOS technology, the transistor Tp" being thereby constantly in its condition at high conductivity, whereas the load resistor Tn1" in the holding memory cell Hij of FIG. 3 executed in N-MOS technology exhibits a low resistance only as long as the gate source voltage effective is greater than the transistor pinch-off voltage, this having a corresponding effect on the signal through-connection between the inputs line ej and the output line ai.

When through-connecting a useful signal exhibiting its lower limit value, the gate terminal of the n-channel transistor Tnk is first charged via the transistor Tp" (FIG. 2) or, respectively, via the transistor Tn1" (FIG. 3) to a potential corresponding to the difference between the inverter feed potential $V_{CC}$ and the transistor pinch-off voltage. When the signal to be through-connected between the input line ej and the output line ai subsequently switches to its upper limit value, i.e. when a positive signal edge occurs on the output line ej, then the same is switched over via the gate-source capacitance of the n-channel transistor Tnk to the gate terminal thereof, whereby the output capacitance of the holding memory cell Hij causes a capacitance voltage division. As a consequence of the constantly-low resistance of the transistor Tp", given a holding memory cell of FIG. 2 constructed in CMOS technology, however, the gate potential of the n-channel transistor Tnk thereby remains essentially unaltered with the result that the useful signal level on the output line ai rises until the gate-source voltage falls below the transistor pinch-off voltage. In order to be able to through-connect a signal with a full signal boost, therefore, a somewhat higher inverter feed potential $V_{CC}$ must therefore be provided under given conditions for the holding memory cell Hij of FIG. 2. Given a holding memory cell of FIG. 3 constructed in M-NOS technology, by contrast, a correspondidng rise in potential by, for example, about 3V occurs at the gate terminal of the n-channel transistor Tnk and, therefore, at the source electrode of the load transistor Tnl" at the same time with the result that the gate-source voltage of the n-channel transistor Tnk does not drop to the transistor pinch-off voltage. The signal to be through-connected is therefore always connected through with a full voltage boost.

In a manner corresponding to the procedure set forth below, the remaining switch elements of the appertaining crosspoint row are inhibited simultaneously with the closing of the n-channel transistor switch Kij.

For opening the n-channel transistor Kij, the holding memory cell Hij is again charged via the row selection line xi with a "1" selection signal, the "H" selection signal, enabling the n-channel transistor Tnh, but is now charged with a "0" level, the selection signal "H", via the column selection line yj, with the result that the transistor Tn" is now driven into its conductive condition via the n-channel transistor Tnh, whereby the transistor Tn' is placed into its inhibited condition. In the exemplary embodiments of FIGS. 2 and 3, the ground potential is then through connected to the gate electrode of the n-channel transistor Tnk via the conductive transistor Tn" so that it become non-conductive, and therefore, the switch elements Kij is blocked.

For testing purposes, it is advantageous to also be able to read out the respective through-connection condition of the crosspoint matrix. For this purpose, the respective inverter circuits (Tn', Tp' in FIG. 2; Tn', Tn1' in FIG. 3) in the individual memory cells Hij in FIGS. 2 and 3 can be connected to tristate-capable decoder outputs yj via respective appertaining n-channel transistors Tnh. Indicated in this respective FIG. 1 is that the signal outputs of the column decoder DY are followed by write switches WR which are assumed to be closed only given the appearance of a write instruction on an enable line wr and then through connect the "1" selection signal ("L") potentially appearing at a decoder output and the "0" selection signals ("H") appearing at the remaining decoder outputs to the indivudal column selection lines y1 ... yj ... yn in a low resistance manner, so that the selected switch elements proceed into their through-connected or, respectively, inhibited conditions in the manner set forth above. When, by contrast, the switch state of a row of crosspoints of the crosspoint matrix is merely to be read, for which purpose the appertaining row selection line, for example the selection line xi, is again charged with a "1" selection signal ("H") as in a connection set-up or cleardown, when the write switch WR remain open as a consequence of the lack of a write instruction on the enable line wr, with a result that the column selection line y1 ... yj ... yn do not receive any control potential from the column decoder DY. By way of the n-channel transistors Tnh (FIGS. 2 and 3) of the holding memory cells (Hij) of the appertaining crosspoint row ... KPij ... of FIG. 1 which are nonetheless unlocked by the row selection signal "H" effective at the gate electrode, the signal state respectively prevailing at the gate electrode of the transistor Tn" (FIGS. 2 and 3) is then through-connected to the respective column selection line (yj in FIGS. 2 and 3) whereby, given faultless operation, a "L" potential can occur on not more than one column selection line y1 ... yj ... yn (in FIG. 1). As likewise indicated in FIG. 1, the address of this column selection line and, therefore, the address of the appertaining crosspoint can be acquired with the assistance of an encoder CZ and can be forwarded to a following register Reg Z.

In order to oppose an undesirable setting or resetting of holding memory cells upon activation of the respective row selection line in such a reading of the through-connection state of crosspoint rows, the gate electrodes of the n-channel transistors Tnh in FIGS. 2 and 3 are advantageously connected to decoder outputs x1 ... xi ... xm affected by a time constant so that the respective line is slowly activated. As likewise indicated in FIG. 1, a series resistor can be respectively inserted into the row selection line x1 ... xi ... xm for this purpose of the decoder output itself can be provided with a high internal resistance. In both instances, a low-pass effect occurs in conjunction with the line capacitance so that the activation of the row selection lines experiences a corresponding retardation.

As already set forth above, the column decoder DY can potentially be charged with a dummy address or with the address of a column of crosspoints unconnected at their input side, being charged therewith proceeding from its input register Reg Y in order to therefore enable the resetting of holding memory cells Hij of a crosspoint row. In this regard, it should be added here that, without being shown in detail in FIG. 1, the n-channel transistors Tnk of FIGS. 2 and 3 of such a column of switch elements Kij of FIG. 1 "unconnected" at their input side, can also have their main electrode at the side of the input line lying at a source of defined potential, for example ground. This results in that those respective output lines ai to which no useful signal connection is throughconnected lie at a defined level that may also be externally influenced for testing purposes.

In conclusion, it should also be noted that the crosspoint matrix can also be provided with expansion inputs to which corresponding outputs of corresponding, other crosspoint matrices of the broadband signal space crosspoint device can be connected. Such expansion inputs can be formed by the inputs ... ej ... of the switch elements ... Kij ... of a column of crosspoints Kpij ... whereby, in a departure from the circuit illustrated in FIG. 1, the individual switch element inputs, . .. ej ... of this column are not connected parallel to one another but form, respectively, individual expansion inputs of the crosspoint matrix.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a broadband signal space switching apparatus of the type comprising a plurality of row selection lines, a plurality of common selection lines intersecting said row selection lines, a plurality of signal input lines, a plurality of signal output lines intersecting said signal input lines and forming crosspoint locations, and in which each of said crosspoint locations comprises a n-channel field effect transistor switch including a source-drain path connected to the respective input and output lines, and a gate, and in which a respective memory cell is provided at each crosspoint and connected to a corresponding row selection line and a corresponding column selection line, and in which a row selection decoder is connected to said row selection lines and a column decoder is connected to said column selection lines, and in which each memory cell comprises an n-channel transistor including a source-drain path connected to the respective column selection line and a gate connected to the respective row selection line and a pair of cross-coupled inverter circuits each including an input and an output, the improvement wherein:

the input of only one of said inverter circuits is connected to said source-drain path of said n-channel transistor; and a resistor connects said output of only one inverter circuit to said gate of said n-channel field effect transistor switch.

2. The improved broadband signal space switching apparatus of claim 1, wherein:

a voltage source is connected to said pair of cross-coupled inverter circuits so that the switching potential applied to said gate of said n-channel field effect transistor switch exceeds the upper value of a signal to be through-connected by more than the field effect transistor switch pinch-off voltage and an inhibit potential below the level derived by increasing the lower value of a signal to be through-connected by the field effect transistor switch pinch-off voltage.

3. The improved broadband signal space switching apparatus according to claim 2, wherein:
    said cross-coupled inverter circuits comprise cross-coupled complementary-metal-oxide-semiconductor inverter circuits.

4. The improved broadband switching apparatus of claim 2, wherein:
    said cross-coupled inverter circuits comprise cross-coupled n-channel inverter circuits.

5. The improved broadband signal space switching apparatus of claim 1, wherein:
    said decoders comprise outputs and means for providing tristate signals at said outputs to said n-channel transistor.

6. The improved broadband signal space switching apparatus of claim 5, wherein:
    said row decoder comprises outputs; and
    a plurality of output resistors respectively connect said outputs of said row decoder to said gates of said n-channel transistors and effect a delay time constant.

7. The improved broadband signal space switching apparatus according to claim 2, wherein:
    n-channel transistor switches include a main electrode connected to a source of defined potential.

* * * * *